Feb. 4, 1930.   S. H. CAPELIS   1,745,600
AIRPLANE
Filed Feb. 6, 1928   2 Sheets-Sheet 1
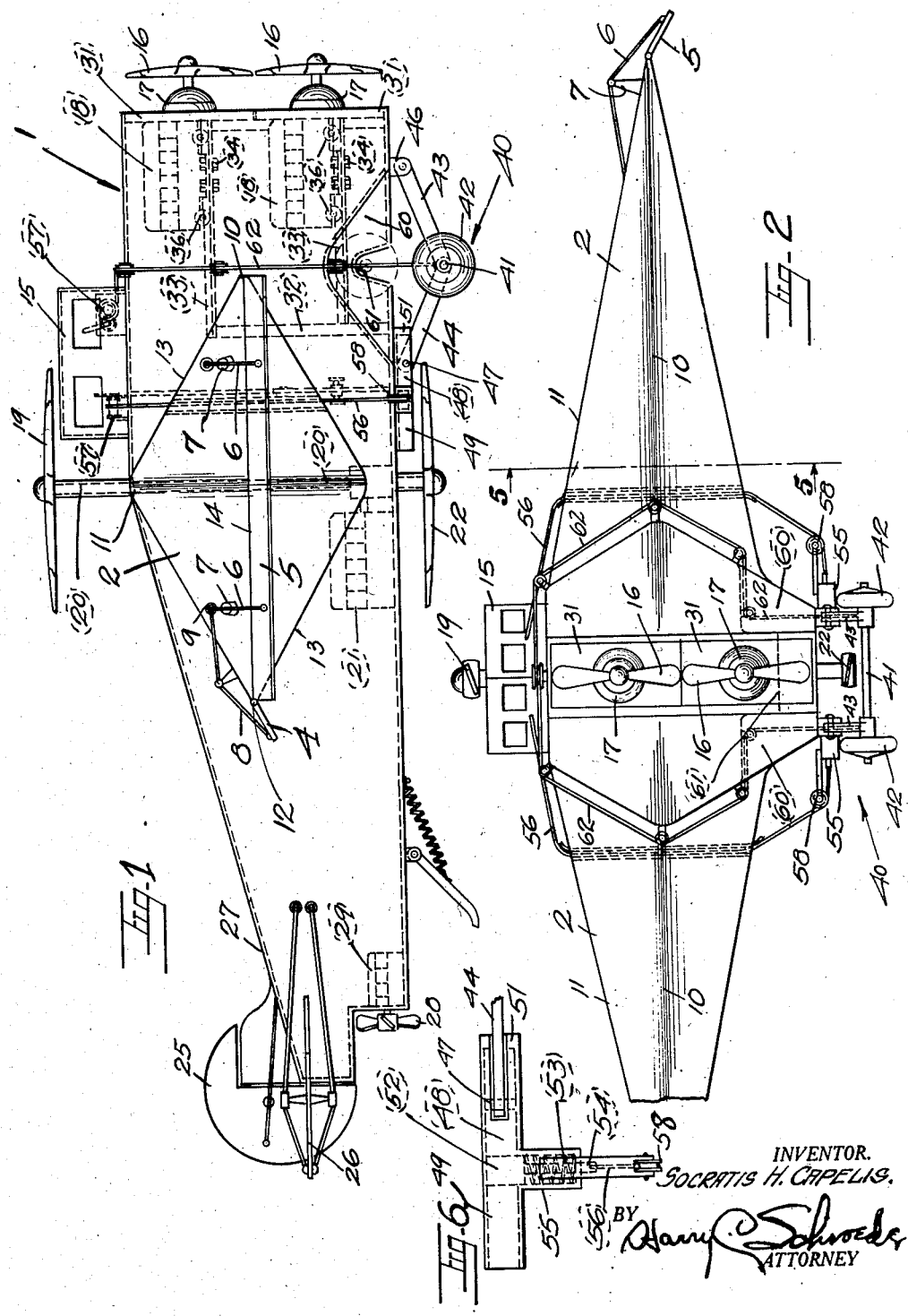
INVENTOR.
SOCRATIS H. CAPELIS.
BY
Harry C. Schroeder
ATTORNEY Feb. 4, 1930.   S. H. CAPELIS   1,745,600
AIRPLANE
Filed Feb. 6, 1928   2 Sheets-Sheet 2
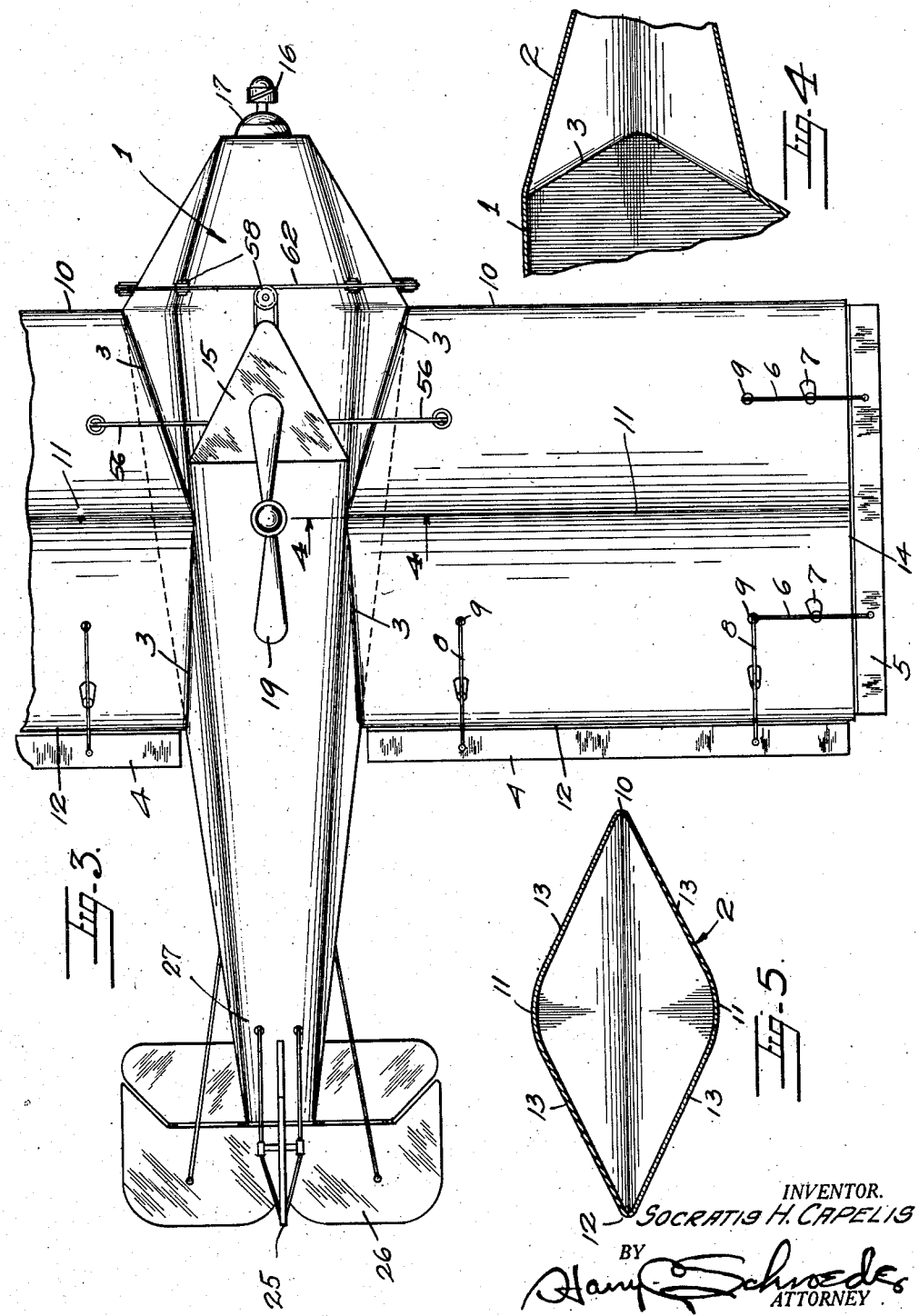
INVENTOR.
SOCRATIS H. CAPELIS
BY
ATTORNEY Patented Feb. 4, 1930

1,745,600

UNITED STATES PATENT OFFICE

SOCRATIS H. CAPELIS, OF EL CERRITO, CALIFORNIA, ASSIGNOR TO CAPELIS SAFETY AEROPLANE CORPORATION, OF EL CERRITO, CALIFORNIA, A CORPORATION OF CALIFORNIA

AIRPLANE

Application filed February 6, 1928. Serial No. 252,099.

The invention forming the subject matter of this application relates to airplanes.

The large number of accidents which occurred during the long distance trial flights over land and sea proved that the principle of the airplane design must be changed so as to provide sufficient buoyancy in the air for smooth flying in a perfectly balanced airplane body, and also to provide an airplane body which floats indefinitely on the water and which can take off from land or water with equal ease and efficiency.

The primary object of the invention is the provision of an airplane body which is so designed as to materially reduce the frictional resistance of the air to the flight and, at the same time, providing sufficient lift to elevate the airplane to high altitudes and maintain the same in a well balanced position.

Another object of the invention is to provide a plurality of propellers so arranged on the airplane as to permit a nearly vertical rising and lowering of the airplane, thereby reducing the necessary landing speed for bringing the airplane down to a locality either on water or land, which is adapted for either the landing or taking off of aircrafts.

A further object of the invention is to provide a propelling mechanism on an airplane which permits the taxiing of the airplane in water and the use of the airplane similarly to a motor boat when the same is forced to land on water.

A still further object of the invention is the provision of a supporting structure for the forward propelling mechanism and the power plant therefor, which structure is so designed as to permit the retraction of the propeller and the power plant thereof to the inside of the airplane fuselage for purposes of repair, thereby obviating the necessity of climbing to the outside of the airplane during the flight to repair a damaged propeller.

A still further object of the invention is to provide a landing gear retracting mechanism by means of which the landing gear may be retracted inside of the stream line of the fuselage, thereby still further reducing the frictional resistance of the airplane.

Another object of this invention is to provide an airplane body construction and propelling mechanism thereon which is highly useful and simple in construction. Convenience of arrangement, lightness, and safety of operation are further objects which have been borne in mind in the construction and development of the invention.

With the above mentioned and other objects in view, the invention consists in the novel construction and combination of parts hereinafter described, and illustrated in the accompanying drawings, and set forth in the claims hereto appended. It is to be understood that various changes in form, proportion, size, and minor details of construction, within the scope of the claims, may be resorted to without departing from the spirit, or without sacrificing any of the advantages of the invention.

With the foregoing and other objects in view, which will be made manifest in the following detailed description and specifically pointed out in the appended claims, reference is had to the accompanying drawings for the illustrative embodiment of the invention, wherein:

Figure 1 is a side elevation of the airplane;

Figure 2 is a front view of the airplane;

Figure 3 is a plan view of the airplane with one of the wings shown partly broken away;

Figure 4 is a fragmentary sectional view taken along the line 4—4 of Figure 3;

Figure 5 is a cross-sectional view of the wing taken on the line 5—5 of Figure 2; and Figure 6 is a fragmentary detail of the releasing mechanism for the landing gear retracting device.

Referring to the accompanying drawings, wherein similar reference characters designate similar parts thruout, the various figures described above adequately illustrate my invention, and the following detailed description is commensurate with the above mentioned drawings in enabling an artisan to construct and assemble the constituent parts of the same.

In carrying out my invention, I make use of a fuselage, designated in its entirety by the numeral 1. This fuselage may be divided into a plurality of nacelles or compartments and passageways leading to different working mechanisms of the airplane. The shape of the fuselage is so formed as to resemble a fish or torpedo and moves thru air or water at ordinary speed, makes little disturbance, and no turbulent wake is left behind. Air, for ordinary transportation, is practically incompressible. The resistance to motion thru air is almost entirely frictional. The fuselage 1 is so designed that the frictional resistance to its motion is materially reduced, and the motion of the air caused by its passage produces an almost perfect stream line motion. The fuselage 1 is built of metal and is completely closed all around so as to render the compartments therein waterproof and to provide sufficient buoyancy for the airplane to remain on the surface of the water, if forced to land thereon.

Wings 2 are formed so as to almost totally eliminate the skin friction when the wings are moving edgewise and to provide a sufficient stream line construction, for reducing the density resistance when the airplane is in motion. The joining edges of the airplane wings to the fuselage are designated by the numeral 3 and are clearly indicated in Figure 4. It is apparent that the wings, as shown, could be used for storage space, or a passage may be provided therein to permit entrance to the wings for the repairs or adjustments that may be necessary during a flight.

Ailerons 4 are hinged on the wings and form the movable auxiliary surface of the airplane, and are disposed at the trailing edge of the wings. Ailerons 5 are disposed at the outside extreme edges of the wings. Said ailerons 5 are hinged, the movement thereof being controlled by cords 6 guided on standards 7, said standards 7 being secured to the top of the wing 2. The ailerons 4 are controlled by cords 8. Both of the cords 6 and 8 enter to the inside of the wing thru an aperture 9 and are connected to and controlled by any conventional means, not shown.

It is to be noted that the wings are so constructed that the top surface thereof slopes upwardly from the leading edge 10, reaching the peak of the slope at about the center line 11 of the wing 2. The surface also slopes from the trailing edge 12 to the peak center line at 11, thereby producing a stream line body shape for the wings 2. The lower surface of the wings forms a similar stream line surface, and the cavity in which the controls are disposed, and which may be used for storage purposes, is enclosed by the sloping walls 13 of the wings. In order to bring the center of gravity of the airplane as close as possible to the center of the airplane body, the area of the wing cross section is gradually decreased toward the extreme edge 14 so that the bulkiest portion of the airplane wings 2 are adjacent and secured to the opposite sides of the fuselage 1. The angular disposition of the edges 11 and the meeting thereof in an extreme edge 14 is clearly shown in Figure 2, while the cross section of the wings, showing the surfaces 13 converging to the leading edge 10 and the trailing edge 12 is clearly illustrated in Figure 5. Of course, all the edges are rounded in accordance with the standard practice accepted in airplane construction.

In order to facilitate the control of the airplane and to permit the construction thereof in the form of a passenger carrier, a pilot cabin 15 is disposed on the top of the fuselage 1. Instruments and controls are conveniently arranged in the cabin by any known means and in any conventional manner, not shown.

The propelling of the airplane is accomplished by means of a plurality of propellers which are disposed around the fuselage. Propellers 16 are disposed on conventional propeller bosses 17 and are directly connected to power plants which, in the present illustration, are shown as gasoline engines 18 and which are disposed inside of the fuselage so as to permit adjustment and repairs during a flight, without the necessity of climbing outside of the fuselage. A propeller 19 is rotatable on a vertically disposed shaft 20 extending from the fuselage and rotated by a motor 21 disposed inside of said fuselage. The propeller 19 functions when it is necessary to almost vertically lower or raise the airplane, thereby materially assisting the landing of the elevating of the aircraft, and, furthermore, materially reducing the speed necessary for landing or elevating the airplane. The propeller 19 creates a suction above the fuselage and the wings, thereby increasing the buoyancy thereof.

In order to produce an increased pressure on the lower surface of the wings and of the fuselage, a lifting propeller 22 is disposed below the body of the fuselage, so as to rotate in a horizontal plane. The propeller 22 is rotated by the vertically disposed shaft 20 and the motor 21.

A rudder 25 and elevator 26 of any conventional type and having a conventional control means thereon are disposed at the end of the tail 27 of the fuselage 1.

In order to raise the airplane from the ground, the propellers 16 are rotated at a moderate speed while the propellers 19 and 22 are rotated at a high speed to create a suction above the fuselage and the wings and a pressure below the fuselage and the wings, respectively, thereby obviating the necessity of a long runway, because the suction created above the fuselage and the wings and the pressure below the fuselage and the wings tend to raise the airplane almost vertically. After the airplane is in the air, the propeller 22 is stopped and further elevation or raising of the airplane is effected by the propeller 19 and the proper use of the controls of the rudder and elevator. The propellers 16 are sufficient to provide the forward propelling force, once the airplane reaches the altitude desired. In order to stabilize the airplane against lateral wind thrust, the auxiliary ailerons 5 are actuated as lateral balancers so as to balance against the lateral action of the wind at the opposite ends of the wings, in accordance with the strength and the direction of the lateral wind.

In the event the airplane is forced to travel on water, a propeller 28 is used, the propeller being of the usual type of water propeller for propelling ships or boats, and it is driven by an engine 29. This auxiliary device makes possible the use of the airplane similarly to a motorboat, and at the same time, the use of the propellers 19 and 16 permits the rising of the airplane from the surface of the water, as well as from land.

It is to be noted that the propellers 16 are disposed, one above the other, so that if, by any accident, one of the propellers or engines fails to function, the remaining propeller can advance the airplane in the air without upsetting the balance thereof.

The propellers 16 are directly connected to their respective engines 18. Radiators 31 on each engine 18 form the front wall of the fuselage. The front wall radiator 31 is secured so as to form one unit with the engine 18 and is held in place thereby. A frame structure 32 is disposed in the prow of the fuselage and carries horizontal rails 33 thereon. The engines 18 are fixedly secured in place by means of bolts 34 extending thru the rails 33, each engine being provided with rollers 36 guided on said rails 33 for the purpose to be hereinafter described. In case either one of the propellers is damaged while the other propeller functions properly, the damaged propeller may be retracted into the fuselage by removing the bolts 34 and by pulling back the engine 18, the radiator front 31, and the propeller 16, which movement is greatly facilitated by the rollers 36 which roll on the rails 33. Thus, the propeller is drawn into the compartment of the fuselage and it, therefore, is not necessary for the mechanic to climb outside of the airplane to make the necessary repairs, for the damaged propeller may be readily replaced inside the fuselage. After the replacement, the propeller 16, the front wall 31, and the engine 18 are pushed back to the original position shown in Figure 1 and are held in place by means of bolts 34. The radiator front walls 31 are so designed as to cover an opening large enough to allow the movement of the propeller 16 therethru. When the walls 31 are secured in place, the front is completely covered thereby.

In order to further reduce the frictional resistance of the airplane in flight, a landing gear, denoted in its entirety by the numeral 40, is made retractible in a manner to be hereinafter described. An axle 41 of the landing gear rotatably carries the wheels 42 at the opposite extremities thereof. Adjacent to the wheels and pivoted on the axle 41 are the toggle links 43 and 44. While the toggle link 43 is pivotally secured to a bracket 46 on the fuselage, the other link 44 is pivotally secured as at 47 to a traveler block 48, which block is guided in its movement in a rail 49, as is clearly shown in Figure 6. When the landing gear is in the position shown in full lines in Figure 1, the movement of the block 48 is restricted by a closed end 51 of the guide rail 49 in one direction. On the other end of the block 48 a plunger 52 blocks the movement of the traveler 48. The plunger 52 is held inside of the guide rail 49 by means of a tension spring 53. A lug 54 extends from the plunger 52 thru a spring housing 55. The plunger 52 extends into the housing 55 and is thereby prevented from moving along the rail 49. To the outside end of the lug 54 is secured a cable 56 leading to a drum 57 or any other conventional winding means in the captain's cabin. The movement of the cable is guided by means of pulleys 58.

When the airplane lands, the stress is taken up by the toggle links 43 and 44 and is transmitted to the fuselage thru the bracket 46 and thru the plunger 52 and the rails 49. During the flight, the landing gear 40 may be retracted into indentations 60 and 61 in the underside of the fuselage. The indentation 60 is so shaped, as to readily receive the links 43 and 44 and the wheels 42, while the indentation 61 is narrower and extends across the bottom of the fuselage so as to receive the axle 41.

In order to retract the landing gear 40, first the winding mechanism 57 is moved so as to withdraw the plunger 52 from the guide rail 49 against the action of the spring 53. Then the axle is drawn up by means of another cable 62 and thru another winding mechanism 57. The cable 62 is guided by pulleys similar to the cable 56. The cables 62 are secured to the opposite side of the axle 41 and elevates the same when drawn upwardly by the winding mechanism; thereby the toggle action of the links 43 and 44 forces the traveler block 48 to move in the rail 49. When the wheels 42 reach the uppermost position thereof, the block 48 is again in the position shown in Figure 6 so that by releasing the cable 56, the plunger 52 is moved in the blocking position by the action of the spring 53; thereby the downward movement of the wheels 42 is effectively blocked.

It is evident that the landing gear 40 may be instantly released by simply withdrawing the plunger 52 and then releasing the cable 62 so that the landing gear 40 drops in the landing position by its own weight. Then by releasing the cable 56, the plunger 52 assumes the blocking position as heretofore described. It is also evident that the retraction of the wheels into the indentations 60 and 61 materially reduces the surface that would otherwise extend below the stream line of fuselage.

It will be recognized that the particular shape of the wings materially reduces the frictional resistance of the air and provides sufficient space therein for checking up and correcting the controls without necessitating the climbing on the outside of the wings and the fuselage. The fuselage and the wings are made in one unit, and all the controlling and driving mechanism is disposed inside of the airplane, thereby shielding the same from any injuries that are usually caused by disturbances in the air. It is also to be noted that the particular arrangement of the propellers and the controlling mechanisms therefor brings the center of gravity of the airplane approximately to the center of the fuselage, and means are provided to counteract any irregular winds that may tend to suddenly unbalance the airplane.

Having thus described my invention, what I now claim as novel and desire to secure by Letters Patent is:

1. In an airplane a fuselage, wings thereon, said wings having four sides enclosing a chamber inside of said wing; two of the sides converging into a leading wing edge, the other two converging into a trailing wing edge, the open ends of said sides being integral with each other, one end of all four sides being secured to said fuselage, the other ends of said sides converging into an outside edge, ailerons on the trailing edge of said wings, and auxiliary ailerons on said outside edge of the wings, said auxiliary ailerons being disposed in parallelism with the longitudinal axis of said fuselage.

2. In an airplane a waterproof fuselage, having a tail thereon, two bow propellers thereon disposed above each other, a landing gear on said fuselage, a propeller disposed on the lower side of said fuselage tail for propelling said fuselage when afloat; wings extending on opposite sides of said fuselage and being integral therewith; ailerons on a trailing edge of each wing; auxiliary ailerons on said wings, said auxiliary ailerons being parallel with the longitudinal axis of said fuselage; a lifting propeller above said fuselage, being disposed in parallelism therewith; and means on said fuselage for rotating said propellers.

3. In an airplane a waterproof fuselage, having a tail thereon, two bow propellers thereon disposed above each other, a landing gear on said fuselage, a propeller disposed on the lower side of said fuselage tail for propelling said fuselage when afloat; wings extending on opposite sides of said fuselage and being integral therewith; ailerons on a trailing edge of each wing; auxiliary ailerons on said wings, said auxiliary ailerons being parallel with the longitudinal axis of said fuselage; a lifting propeller above said fuselage, said lifting propeller being disposed in parallelism with said fuselage, a compressing propeller below said fuselage and above said landing gear and in parallelism with said lifting propeller, said compressing propeller being adapted to create a pressure below said fuselage and said wings; and means on said fuselage for rotating said propellers.

4. In an airplane a waterproof fuselage, having a tail thereon, two bow propellers thereon disposed above each other, a landing gear on said fuselage, a propeller disposed on the lower side of said fuselage tail for propelling said fuselage when afloat; wings extending on opposite sides of said fuselage and being integral therewith; ailerons on a trailing edge of each wing; auxiliary ailerons on said wings, said auxiliary ailerons being parallel with the longitudinal axis of said fuselage; a lifting propeller above said fuselage and disposed in parallelism therewith; a compressing propeller below said fuselage and above said landing gear and in parallelism with said lifting propeller, said compressing propeller being adapted to create a pressure below said fuselage and said wings; and means inside of said fuselage for rotating said propellers; said wings having four sides enclosing a chamber inside of said wing; two of the sides converging into a leading wing edge, the other two converging into a trailing wing edge, the open ends of said sides being integral with each other, one end of all four sides being secured to said fuselage, the other ends of said sides converging into an outside edge, and adapted to support said auxiliary ailerons.

5. In an airplane a fuselage, having a prow and a tail; two propellers on the prow being disposed above each other; a lifting propeller above said fuselage adapted to rotate in a plane parallel with the longitudinal axis of the fuselage; a compressing propeller disposed below said fuselage and adapted to be rotated in a plane parallel with the lifting propeller; and means for driving said propellers, said means disposed inside of said fuselage, the front of said fuselage being formed in sections, each section forming a unit with the driving mechanism of a prow propeller; a structure in said fuselage, detachably supporting said last driving mechanism and propeller so as to guide the said driving mechanism when the same is detached and retracted thereon into said fuselage.

In testimony whereof I affix my signature.

SOCRATIS H. CAPELIS.